US007849214B2

(12) United States Patent
Park et al.

(10) Patent No.: US 7,849,214 B2
(45) Date of Patent: Dec. 7, 2010

(54) PACKET RECEIVING HARDWARE APPARATUS FOR TCP OFFLOAD ENGINE AND RECEIVING SYSTEM AND METHOD USING THE SAME

(75) Inventors: Chan Ho Park, Daejeon (KR); Seong Woon Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 439 days.

(21) Appl. No.: 11/949,738

(22) Filed: Dec. 3, 2007

(65) Prior Publication Data

US 2008/0133798 A1 Jun. 5, 2008

(30) Foreign Application Priority Data

Dec. 4, 2006 (KR) ...................... 10-2006-0121317
Sep. 28, 2007 (KR) ...................... 10-2007-0098193

(51) Int. Cl.
*G06F 15/16* (2006.01)

(52) U.S. Cl. ........................ 709/238; 709/224; 370/463

(58) Field of Classification Search ......... 709/200–202, 709/224, 238, 239; 370/463
See application file for complete search history.

(56) References Cited

U.S. PATENT DOCUMENTS 6,591,302 B2 7/2003 Boucher et al.
7,523,179 B1 * 4/2009 Chu et al. ................... 709/222
7,539,204 B2 * 5/2009 Shalom et al. .............. 370/428
7,596,144 B2 * 9/2009 Pong .......................... 370/400
2003/0076822 A1 * 4/2003 Shalom et al. ............. 370/378
2005/0122986 A1 6/2005 Starr et al.
2005/0226238 A1 10/2005 Hoskote et al.
2006/0168281 A1 7/2006 Starr et al.
2008/0310420 A1 * 12/2008 Aloni et al. ............ 370/395.52

FOREIGN PATENT DOCUMENTS

JP 2006260543 9/2006
KR 1020010076328 8/2001
KR 1020060064511 6/2006

* cited by examiner

*Primary Examiner*—Moustafa M Meky
(74) *Attorney, Agent, or Firm*—Rabin & Berdo, P.C.

(57) ABSTRACT

A hardware apparatus for receiving a packet for a TCP offload engine (TOE), and receiving system and method using the same are provided. Specifically, information required to protocol processing by a processor is stored in the internal queue included in the packet receiving hardware. Data to be stored in a host memory is transmitted to the host memory after the data is stored in an external memory and protocol processing is performed by the processor. With these techniques, it is possible that a processor can operate asynchronously with a receiving time of a practical packet and it is possible to reduce an overhead that processor deals with unnecessary information.

23 Claims, 8 Drawing Sheets

PACKET RECEIVING HARDWARE APPARATUS FOR TCP OFFLOAD ENGINE AND RECEIVING SYSTEM AND METHOD USING THE SAME

CROSS-REFERENCE TO RELATED APPLICATIONS

This application claims the priorities of Korean Patent Application No. 2006-121317 filed on Dec. 4, 2006 and Korean Patent Application No. 2007-98193 filed on Sep. 28, 2007 in the Korean Intellectual Property Office, the disclosure of which is incorporated herein by reference.

BACKGROUND OF THE INVENTION

1. Field of the Invention

The present invention relates to an apparatus for receiving a packet for a TCP offload engine (TOE), and more particularly, to a hardware apparatus for receiving a packet for a TOE in which a processor can operate asynchronously with a receiving time of a practical packet by separately managing information needed to directly process the packet by using the processor and information to be stored in a host memory by analyzing a type of the packet received from the IP layer and it is possible to reduce an overhead that processes unnecessary information.

This work was supported by IT R&D program of MIC/IITA[2005-S-405-02, A Development of the Next Generation Internet Server).

2. Description of the Related Art

In the past, most of protocols are processed by using software in a central processing unit (CPU). Specifically, when receiving a packet, in order to process the packet, a protocol related task is performed by reading a header part from the packet stored in a buffer, and a payload part remaining is copied a user memory area.

Then, in order to increase a speed of processing a protocol, a TCP offload engine (TOE) is used. A part of tasks of the CPU is processed by a processor embedded in a TOE card. In this case, when a packet is received, it is determined whether the packet is a normal packet by calculating a checksum through a support of a media access control (MAC) or by allowing a processor to directly read the packet.

When the packet is normal, the type of the packet is identified. When the packet is a TCP/UDP packet, a socket is searched by using IP and port numbers of the packet. Then, the protocol is processed based on the information on the socket, and payload data is copied into a user memory area, if necessary. When the packet is not a TCP/UDP packet, the packet is processed in other way according to the type of the packet. For example, when the packet is an internet control message protocol (ICMP) echo packet, a response packet has to be transmitted.

When a processor has to rapidly process the packets before a receiving buffer is full. However, when the processor performs another task or when a buffer size is not sufficient, the buffer will be full, and packets may be lost.

SUMMARY OF THE INVENTION

Accordingly, in order to solve the aforementioned problem, even in a case where an embedded processor cannot process a received packet since the embedded processor performs another task, there is needed a unit for effectively receiving packets by enabling packets to be continuously received by separately managing information practically needed for a processor and information to be stored in an external memory by analyzing a received packet.

According to an aspect of the present invention, there is provided a hardware apparatus for receiving a packet for a TCP offload engine (TOE), the hardware apparatus comprising: a header processing part analyzing a header of a packet transmitted from an IP layer, classifying the type of the packet, extracting information to be transmitted to a processor, and storing the information in a queue; a memory interfacing part, extracting information to be stored in a host memory based on the analysis result of the header processing part from the packet and storing the information to be stored in the host memory; and a memory table allocating an address of the external memory and transmitting the address of the external memory to the memory interfacing part.

In the above aspect of the present invention, the memory table may include: an allocation table allocating or releasing memory areas in response to an allocation request or release request to be transmitted from the memory interfacing part or processor; and a memory table controller arbitrating requests of the memory interfacing part and the processor.

According to another aspect of the present invention, there is provided a receiving system using a packet receiving hardware for a TOE, the receiving system comprising: packet receiving hardware storing information to be transmitted to a processor in an internal queue and storing information to be transmitted to a host memory in an external memory by analyzing a packet received from an IP layer; a reception processor processing a protocol by using the information stored in the queue; and a DMA controller transmitting the information stored in the external memory to the host memory, when the protocol is completely processed by the reception processor.

According to another aspect of the present invention, there is provided a method of receiving a packet for a TOE, the method comprising: analyzing a packet received from an IP layer; storing a part to be transmitted to a host memory based on the analysis result in an external memory; extracting information to be transmitted to a processor based on the analysis result and storing the extracted information in a queue; processing a protocol by using a processor by using the information stored in the queue; and transmitting the information stored in the external memory to the host memory, when the protocol is completely processed.

In the above aspect of the present invention, the analyzing of the packet may include: receiving the packet from the IP layer; extracting header information from the received packet; and analyzing the header information. The storing of the part to be transmitted to the host memory may include: extracting a part to be transmitted to the host memory from the packet as the analysis result; and storing the extracted information in an allocated area of the external memory by using index information of a memory area allocated by a memory table.

At this time, the storing of the extracted information in the allocated area of the external memory may include: requesting the memory table to allocate memory areas by the memory interfacing part; and extracting an index of an empty area in the external memory by using the memory table in response to the request and transmitting the extracted index to the memory interfacing part.

In the hardware apparatus for receiving a packet for the TOE, it is possible to normally receive a packet, even in a case where an embedded processor operates asynchronously with a receiving time of a practical packet.

In addition, in the hardware apparatus for receiving a packet for the TOE, it is possible to reduce an overhead by reading and transmitting data not to be practically processed by a reception processor to another processor by distributing data by determining processors based on types of packets. In addition, in the hardware apparatus for receiving a packet for the TOE, and receiving system and method using the same, since it is possible to rapidly manage a memory while reducing an overhead to be processed by the reception processor by including a separate memory table for managing an external memory, it is possible to rapidly process a packet, even in a case where there is no sufficient memory in a chip.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. When it is determined that the detailed descriptions of the known techniques or structures related to the present invention depart from the scope of the invention, the detailed descriptions will be omitted.

Figure 1:
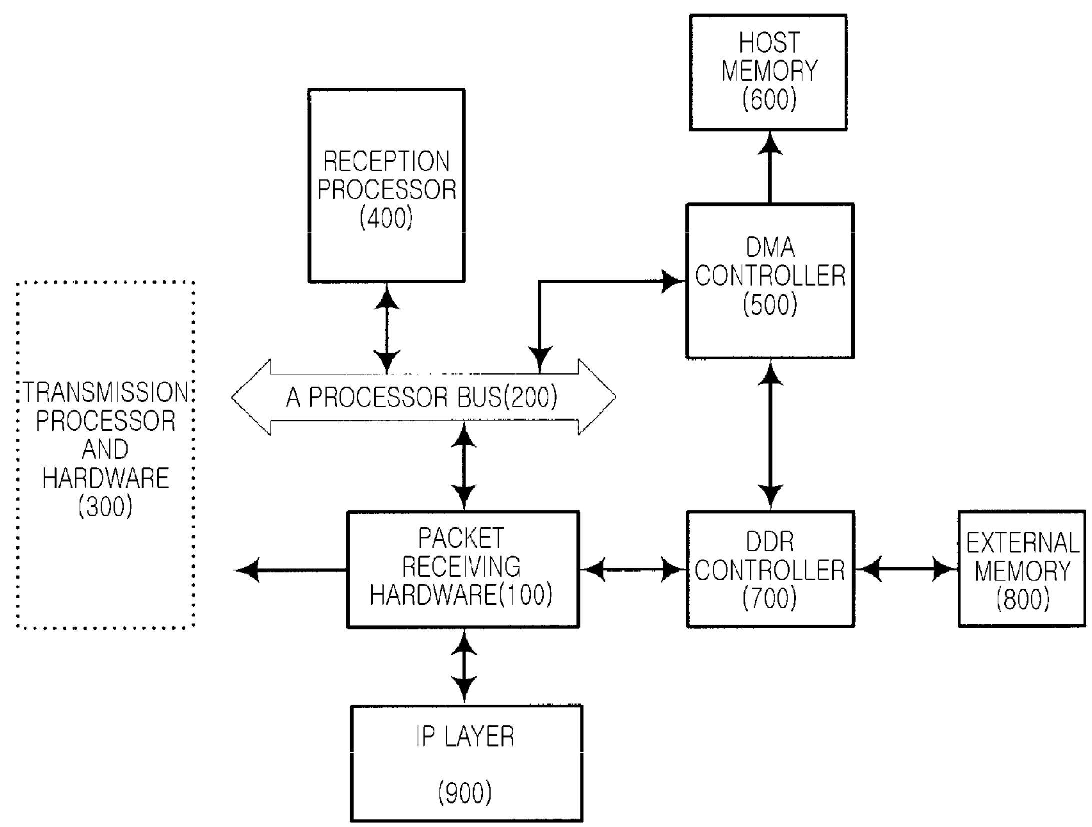
FIG. 1 illustrates a configuration of a receiving system using a packet receiving hardware for a TCP offload engine (TOE) according to an embodiment of the present invention.

FIG. 1 illustrates a configuration of a receiving system using a packet receiving hardware for a TCP offload engine (TOE) according to an embodiment of the present invention.

Referring to FIG. 1, in the receiving system according to the embodiment of the present invention, a packet is received from an IP layer. Packet receiving hardware 100 analyzes the type of the packet and stores information needed for processing the packet by using a process or in an internal queue. The packet receiving hardware 100 stores information to be transmitted to a host memory 600 such as payloads of TCP and UDP packets in an external memory 800. A protocol is processed by using information stored in the queue, and information stored in the external memory is transmitted to a host memory 600.

Specifically, the packet receiving hardware 100 receives packets through an IP layer 900. The packet receiving hardware 100 classifies the received packets based on the types of the packets by analyzing the received packets. Roughly, the packets are classified into packets having information to be stored in the external memory 800 and packets that need not to be stored.

For example, when a packet is classified into the TCP/UDP including a payload, information to be processed by a processor is extracted from a header of the packet and stored in the internal queue. The payload is stored in the external memory 800 through a double data rate (DDR) SDRAM controller 700.

The reception processor 400 processes a necessary protocol by reading information stored in the queue of the packet receiving hardware 100 through a processor bus 200. In addition, the reception processor 400 transmits the information stored in the external memory 800 to the host memory by controlling a direct memory access (DMA) controller 500. In addition, the packet receiving hardware 100 may transmit a part of information to a transmitter 300 according to the type of the packet. The reception processor 400 may exchange information with the transmitter 300 in a procedure of processing a protocol.

Figure 2:
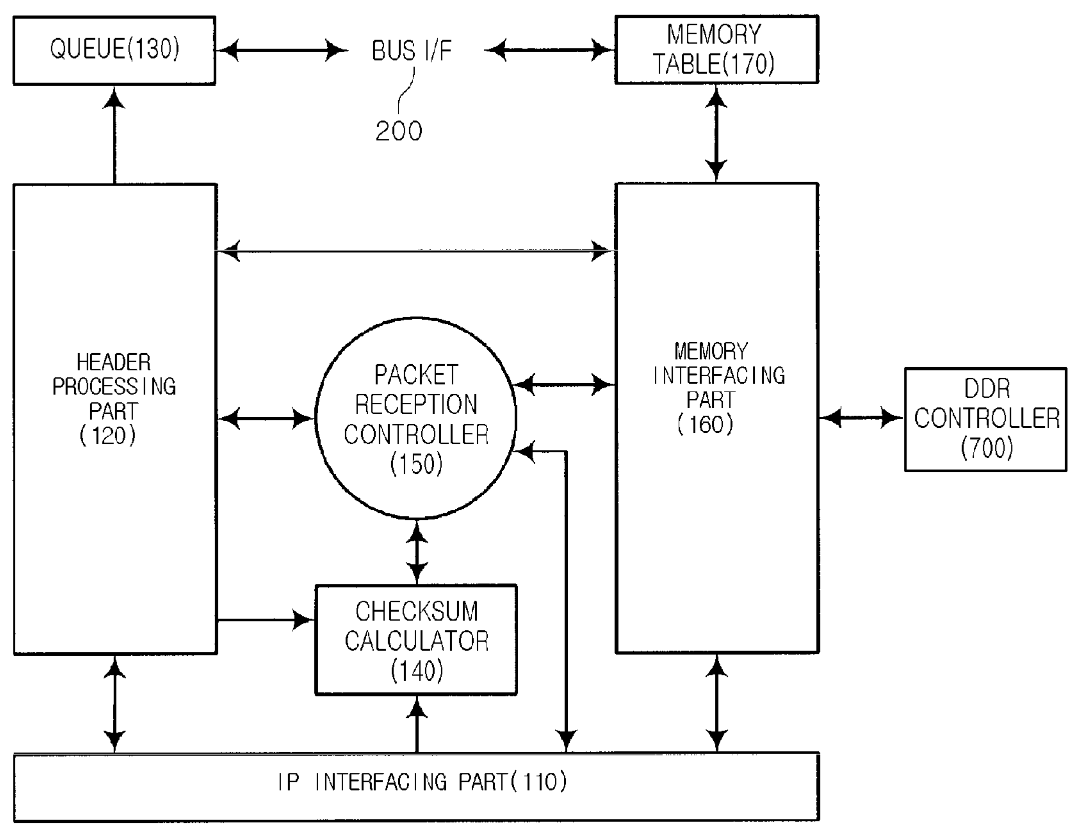
FIG. 2 illustrates a structure of a packet receiving hardware for a TOE of a receiving system according to an embodiment of the present invention.

FIG. 2 illustrates a structure of a packet receiving hardware for a TOE of a receiving system according to an embodiment of the present invention.

Referring to FIG. 2, the packet receiving hardware 100 of the TOE receiving system according to the embodiment of the present invention includes an IP interfacing part 110 for receiving a packet from an IP layer, a header processing part 120 for analyzing the received packet, a queue for storing information needed for processing of a processor, a memory interfacing part 160 for storing information to be transmitted to a host memory in an external memory, a memory table 170 for managing the external memory, a checksum calculator 140 for calculating a checksum of the packet, and a packet receiving controller 150 for controlling the header processing part 120, the memory interfacing part 160, the checksum calculator 140, and the like.

Specifically, the IP interfacing part 110 reads a packet through interface with the IP layer. The IP interfacing part 110 firstly reads an IP header, when a packet is prepared in the IP layer. The input IP header is transmitted to the header processing part 120.

The header processing part 120 extracts necessary information from the IP header and informs the IP interfacing part 110 of the number of words to be read according to types of protocols by determining which number of words is to be read in the next time. When the packet is a TCP/UDP packet, pseudo header information is transmitted to the checksum calculator 140 to calculate the checksum. When the header is completely read, the header processing part 120 informs the packet reception controller 150 that the header is completely processed.

After header processing, the memory interfacing part 160 does not operate if the type of packet is one of three kinds of Internet Control Message Protocol (ICMP) packets or packets which does not include payload data. Three kinds of ICMP packets are echo request, timestamp, and redirect packets. And an example of packets not including payload data is TCP SYN packet In the other cases, since the entire packet or payload has to be stored in the external memory 800, the packet reception controller 150 instructs the memory interfacing part 160 to operate.

The memory interfacing part 160 receives an address of an external memory to store data from the memory table 170. Then, the memory interfacing part 160 reads data to be stored in the external memory from the IP layer and stores the data in the external memory through the DDR controller 700.

As a result of analyzing the packet by using the header processing part 120, packets except the three types of ICMP packets and the TCP/UDP packets transmitted to the host memory with header and processed by the host memory. The packets are classified into raw packets. Header information is temporarily stored in the header processing part 120. The memory interfacing part 160 reads the header information and stores the header information in the external memory. Then, the memory interfacing part 160 reads the remaining part of the packet through the IP interfacing part 110 and stores the remaining part in the external memory.

When the operation of the memory interfacing part 160 is completed, a final checksum result is obtained by the checksum calculator 140. In case of a packet in which the operation of the memory interfacing part 160 is unnecessary, After the operation of the header processing part 120 is completed, the final result is obtained.

In a case where the checksum calculated by the checksum calculator 140 is normal, when the header processing part 120 is informed that the checksum is normal, the header processing part 120 stores information needed by the processor in the queue 130 and informs the packet reception controller 150 that the information is stored. When the checksum is abnormal, the header processing part 120 deletes all of the temporarily stored information to return to an initial status. If data is stored in the external memory, packet reception controller 150 also informs the memory interfacing part 160 that checksum is abnormal. Then the memory interfacing part releases allocated memory area through the memory table 170. When processing of a packet is completed, it is checked whether there is a packet received to the IP layer. When there is the packet, the packet is processed, again.

The queue 130 includes a bus interface 200 so as to allow the processor to read data from the queue 130. In addition, the queue 130 includes two parts. One part is connected to a reception processor bus, and another part is connected to a transmission processor bus.

Figure 3:
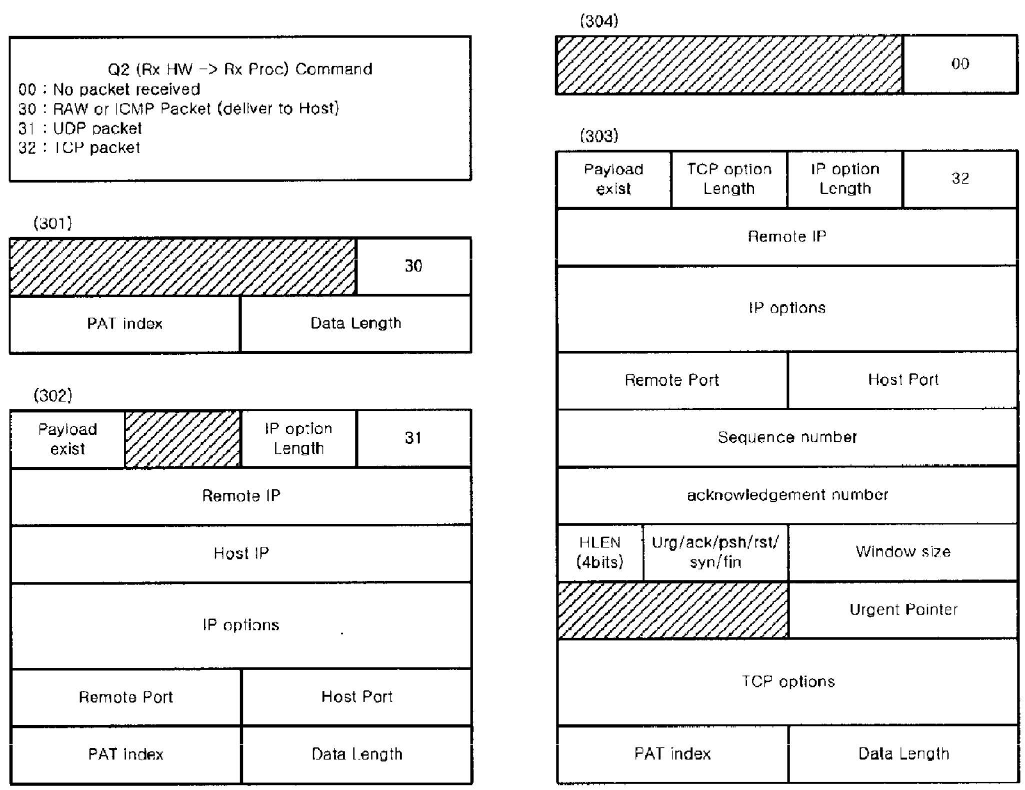
FIG. 3 illustrates a format of a queue connected to a reception processor bus according to an embodiment of the present invention.

FIG. 3 illustrates a format of a queue connected to a reception processor bus according to an embodiment of the present invention.

Referring to FIG. 3, a reception processor 201 frequently performs a polling process. At this time, when the lowest byte of the read data is 0x00 (304), since a packet is not received, a packet is not read any more. The reception processor performs other tasks.

When the lowest byte is 0x30, 0x31, or 0x32, there is a received packet. The packet is processed as follows.

When the lowest byte is 0x30 (301), a packet that has to be entirely transmitted to the host is received. At this time, one more word indicating a payload allocation table (PAT) index value and a data length value are read. The PAT index value indicates an index value of a memory allocated by the memory table 170. When the size of a block of the external memory is 1.5 Kbytes, a starting address of the external memory in which the packet is stored is a value obtained by multiplying the index by 1.5 Kbytes. The data length value indicates the number of bytes of data stored from the starting address.

A case where the lowest byte is 0x31 (302) indicates that a UDP packet is received. At this time, more than 4 words of data are is further read. If there is no IP option header, only 4 words are read. The Payload_exist field represents a value for representing whether the packet includes a payload. In case of a UDP packet, the value of the Payload_exist field is always one.

When the lowest byte is 0x32 (304), a TCP packet is received. At this time, more than 6 words of data are is further read. When the value of the Payload_exist field is one, one more word has to be read so as to read the PAT index value and the data length value.

Figure 4:
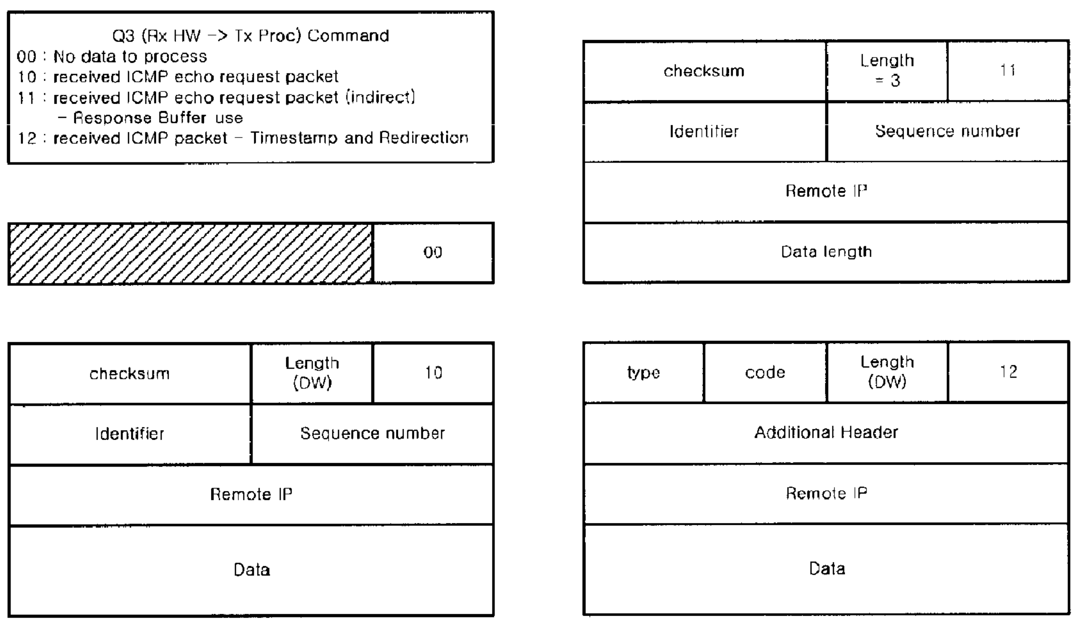
FIG. 4 illustrates a format of a queue connected to a transmission processor bus according to an embodiment of the present invention.

FIG. 4 illustrates a format of a queue connected to a transmission processor bus according to an embodiment of the present invention.

Referring to FIG. 4, the transmission processor also frequently reads a packet through a polling process. When the lowest byte is not 0x00, data of which amount is the value of the length field is further read and processed. In case of an echo request packet and a timestamp packet among the ICMP packets, the transmission processor generates and transmits a response packet. Since the transmission processor manages a routing table, the redirect packet is also updated by using the transmission processor. The echo request packet is frequently used for a ping program. In general, 32 bytes of data is used. However, in case of a large amount of data, in order to reduce an overhead to be read by the transmission processor, the data part is separately stored in a response buffer. When the transmitter transmits the packet, it is possible to speedily process the packet by adding a header to the packet. The queue connected to the transmission processor is designed so as to increase a process speed by transmitting a packet to be transmitted by the transmitter among received packets without passing through the reception processor 400.

Figure 5:
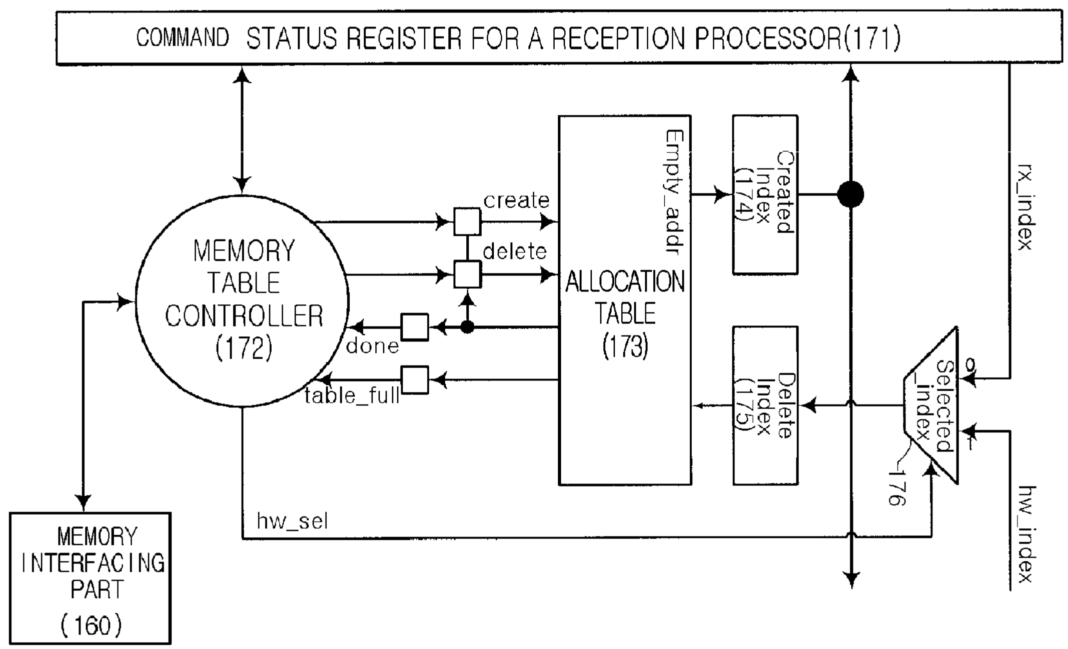
FIG. 5 illustrates a structure of a memory table according to an embodiment of the present invention.

FIG. 5 illustrates a structure of a memory table according to an embodiment of the present invention.

The memory table includes a memory table controller 172 connected to the memory interfacing part 160, an allocation table 173 which generates or invalidates memory index for allocating an external memory, and a command status register 171 for the reception processor.

The allocation table 173 performs a main function of the memory table. In the main function performed by the allocation table 173, the external memory is divided into a predetermined number of areas. When receiving a request for allocating memory area from the memory interfacing part 160, the memory interfacing part 160 is informed of index of empty areas in the external memory. When receiving a request for releasing memory areas together with index, the memory areas corresponding to the index is released so as to allow the memory areas to be used.

The reception processor 400 requests the command status register 171 allocate or release memory areas through the processor bus.

The memory table controller 172 arbitrates between the memory interfacing part 160 and the reception processor 400 so as to allow the allocation table 173 to be used by both of them. In general, the memory interfacing part 160 receives an allocation request, and the reception processor 400 receives a release request. However, in case of a checksum error, the memory interfacing part 160 may receive a release request.

Figure 6:
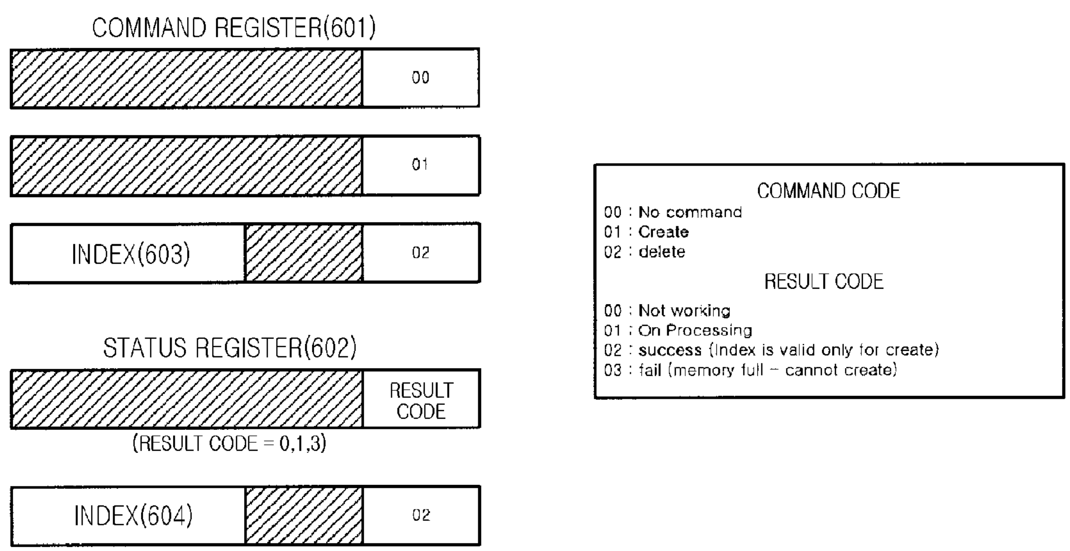
FIG. 6 illustrates formats of command and status registers for a reception processor of a memory table according to an embodiment of the present invention.

FIG. 6 illustrates formats of command and status registers for a reception processor of a memory table according to an embodiment of the present invention.

The reception processor 400 may use a command code of 0x01 as an allocation request and use a command code of 0x02 as a release request. In practice, the reception processor 400 only uses a release request. When a command is transmitted, the status register 602 displays a result code of 0x01. This indicates that the command is being executed. When the execution of the command is completed, the result code of 0x02 is displayed in the status register 602. At this time, an index field 604 is meaningless. When the command register 601 receives a command code of 0x01 for an allocation request, although the command code is not used while processing a protocol, a code of 0x02 (success) or 0x03 (failure)

is displayed in a result code of the status register 602. In case of a success, an area of the index 604 is allocated. When there is no available space, a code of 0x03 for representing a failure is displayed.

Figure 7:
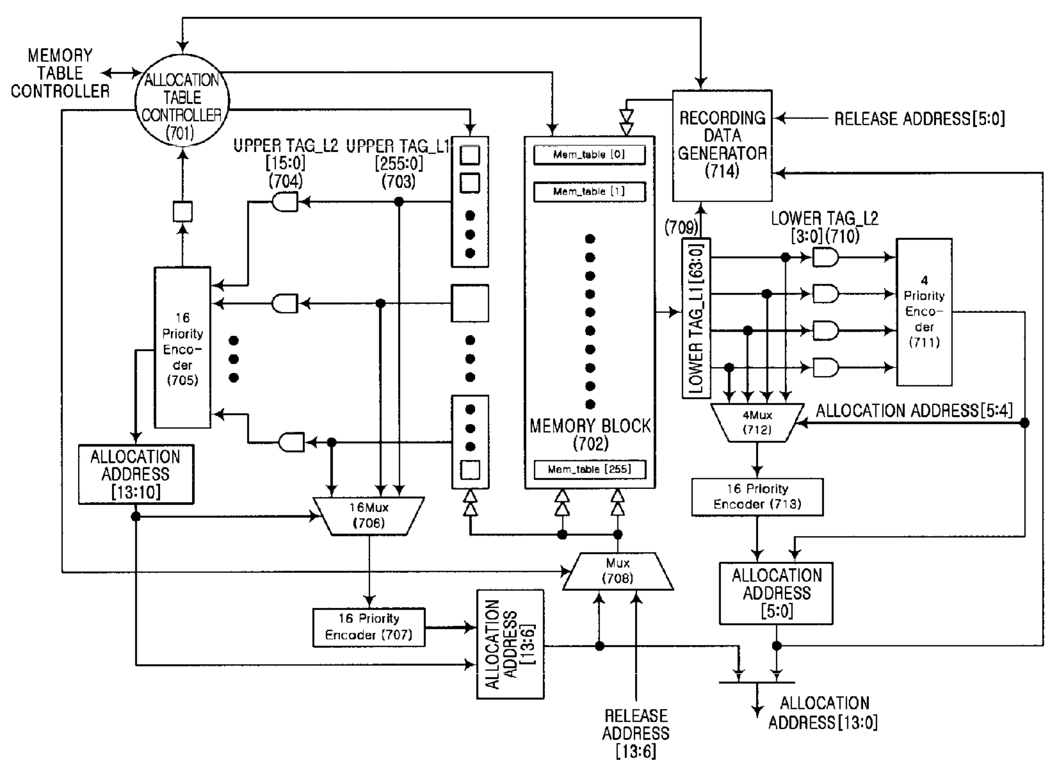
FIG. 7 illustrates a detailed structure of an allocation table among memory table elements according to an embodiment of the present invention.

FIG. 7 illustrates a detailed structure of an allocation table 173 according to an embodiment of the present invention.

The allocation table 173 is a hardware for dynamic memory management similar to software functions such as malloc( ) and free( ) by dividing large memory area into lots of small sized memory. It's logical function is similar to software functions except that only one fixed size of memory area can be allocated at a time. Even in a case where it is impossible to use the software function, or where the memory areas cannot be managed by Operating System (OS), it is possible to manage the memory by using this hardware. In addition, when using this hardware, it is possible to manage the memory area more speedily compared with a case of using the software function.

Referring to FIG. 7, the allocation table 173 manages 16384 numbers of areas of the external memory. Since one area uses 1.5 Kbytes in which a packet can be stored, 24 Mbytes of external memory are used. When the amount of external memory is small, it is possible to manage a less number of areas by reducing the size of the allocation table. Alternatively, it is possible to reduce the memory size of each area. Since the packet has not always the size of 1.5 Kbytes, it is possible to effectively manage the memory by dividing each area into smaller size of areas. However, since a packet may be divided and included in a plurality of memory areas, the memory interfacing part 160 has to request the memory table 170 to allocate a memory, many times. And When the header interfacing part 120 records information in the queue, allocation information on a plurality of external memories is necessary. The overhead may causes slight deterioration of performance.

A memory block 702 includes 256 numbers of words. Each word includes 64 numbers of bits. Accordingly, the memory block 702 includes 16384 numbers of bits. Each bit represents whether a memory corresponding to an index of the bit is used or not. An upper tag_L1 703 indicates 256 numbers of one bit register. When all the 64 numbers of bits of a word in the memory block 702 represent 1's the register represents 1. The upper tag_L1 is divided into areas having 16 numbers of bits and when all of the 16 numbers of bits represent 1's an upper tag_L2 704 represents 1. For example, when all of the upper tag_L1 [63:48] represent 1's the upper tag_L2 [3] represents 1. When the 16 bits of the upper tag_L2 704 are calculated by a priority encoder 705, the calculation result indicates top four bits [13:10] of an address to be allocated. The priority encoder 705 searches the first bit 0 from the least significant bit. When all the bits of the upper tag_L2 represent 1's since there is no more applicable memory area, it is informed the allocation table controller that no more memory is available.

The calculated allocation address [13:10] is input as a selection signal of 16Mux 706 to select 16 bits of the upper tag_L1 which generate the upper tag_L2 contributing to generation of the allocation address [13:10]. The selected 16 bits of the upper tag_L1 are determined as an allocation address [9:6] through a 16 priority encoder 707. The address is combined with previously calculated upper bits to generate an allocation address [13:6].

The allocation address [13:6] is used as an address for reading data of the memory block 702. The read data becomes a lower tag_L1 [63:0] 709. The data having 64 bits is divided into four data having 16 bits to generate a lower tag_L2 [3:0] 710. Similarly to the upper tag, when all of the 16 bits represent 1's the lower tag_L2 710 represents 1. The lower tag_L2 710 is determined as an allocation address [5:4] through a 4 priority encoder 711. Similarly, the allocation address is input as a selection signal of the 4Mux 712. The selected 16 bits of the lower tag_L1 are determined as an allocation address [3:0] through the 16 priority encoder 713. The allocation addresses are combined with a previously determined allocation address to generate an address to be finally allocated.

An allocation address [5:0] is input into a recording data generator 714. The recording data generator 714 generates data to be recorded in the memory block 702 by masking a value of the lower tag_L1 709. Specifically, in case of allocation, bits corresponding to an allocation address among 64 numbers bits of the lower tag_L1 value are changed into 1 by using the allocation address [5:0]. Then, the allocation table controller 701 records the data in the corresponding address of the memory block 702. The corresponding address is determined by using the allocation address [13:6]. In addition, if all the bits represent 1's as a result of masking, it is reported to the allocation table controller 701 that all the bits represent 1's. When the data is recorded in the memory block 702, the corresponding bit of upper tag L1 703 is also recorded as 1.

The aforementioned cycle is a process of allocating an address. Although the current hardware uses seven clocks by using a register with each stage, it is possible to reduce the number of clocks according to clock frequencies and speed factor of devices. In addition, when there is no input, available allocation addresses are already calculated. Accordingly, when there is a request for a memory, a corresponding address is informed without delay. However, in order to subsequently process the next allocation command, several number of clocks are required to complete one cycle.

A process of releasing a memory will be described in the following. When receiving a command for releasing a memory, a MUX 708 selects releasing address [13:6] and data from the memory block 702 with this address is read. The read lower tag_L1 709 is input into the recording data generator 714. A bit corresponding to the releasing address [5:0] are cleared as 0. The result is stored in the memory block 702 by the allocation table controller 701, again. A bit of the upper tag_L1 703 corresponding to the releasing address [5:0] are also cleared. When the upper tag_L1 703 is changed, the allocation address may be changed. For this, some clocks may be additionally used. However, similarly to the allocation process, when receiving a release command, the releasing process does not need to wait. Some clocks are required as a preparation period only for the next allocation or releasing command.

The allocation table has a structure that always the lowest unused index in the memory is allocated. In a case where memories are classified into fast memories and slow memories, by mapping a fast memory to low indices, it is possible to increase the usage frequency of the fast memory and reduce the usage frequency of the slow memory.

Figure 8:
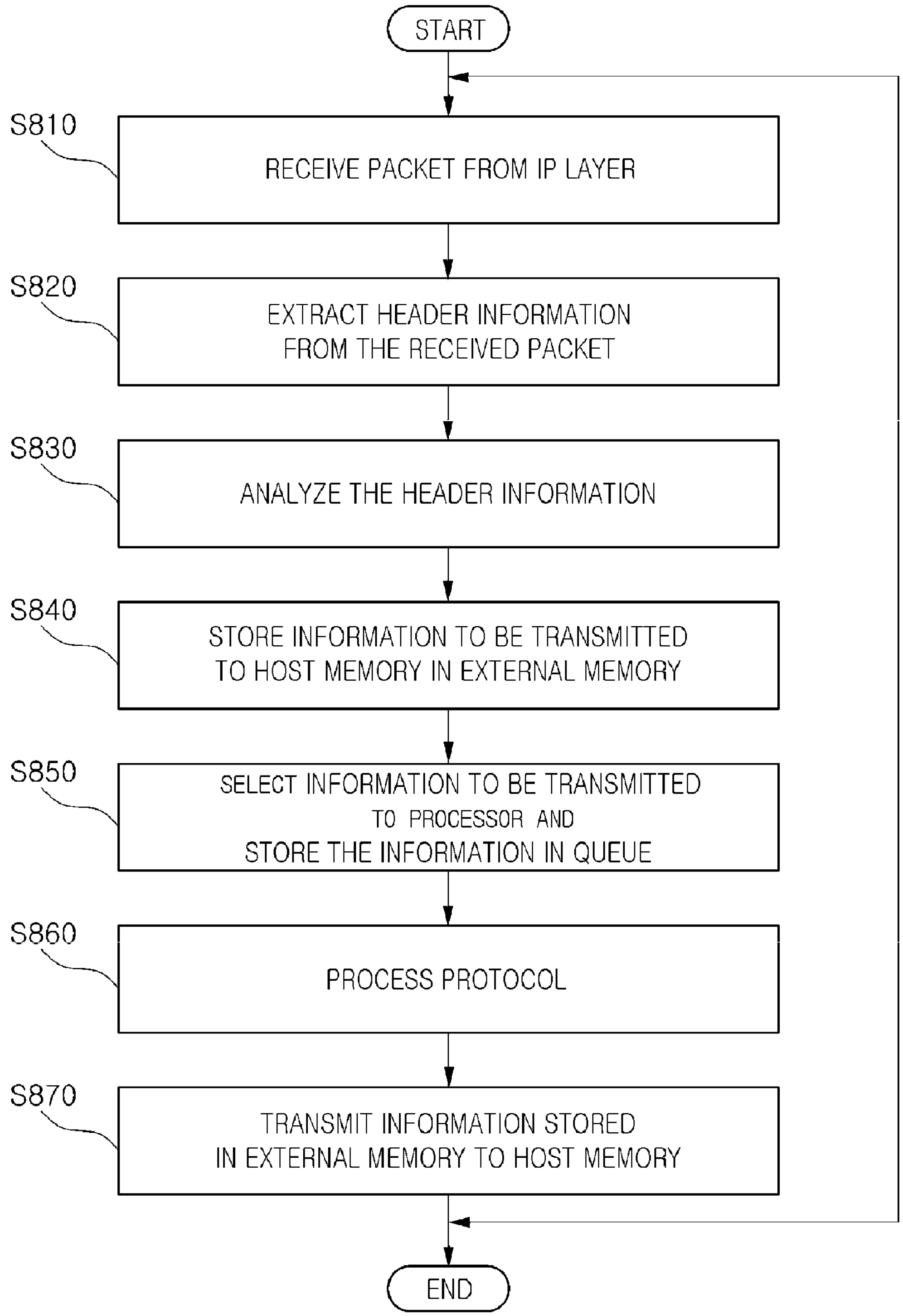
FIG. 8 is a flowchart of a receiving method using a packet receiving hardware for a TOE according to an embodiment of the present invention.

FIG. 8 is a flowchart of a receiving method using TOE packet receiving hardware according to an embodiment of the present invention.

Referring to FIG. 8, when a packet is prepared in an IP layer, a packet is received by using the IP interfacing part 110 (S810).

When the packet is received, header information of the packet is extracted (S820). The header information of the packet represents the type of the packet. FIG. 8 illustrates that the header information is extracted after the packet is received from the IP layer. However, in practice, header information is firstly received and extracted from the packet. After that, the other information except the header information is received.

When the header information of the packet is extracted, the header information is analyzed (S830). The types of the received packets are classified by analyzing the header information. Roughly, the type of the packet is classified like these; A TCP or UDP packet of which payload has to be transmitted to a host memory, a packet which has to be entirely transmitted to the host memory, or a packet which needs not to be transmitted to the host memory.

Information to be transmitted to the host memory is extracted from the packet and stored in the external memory (S840). When it is necessary to transmit the entire packet to the host memory, the information extracted from the packet so as to be processed by the header processing part 120 is stored in the external memory as well. Then, the other information of the packet is transmitted and stored in the external memory.

The memory table allocates memory area for the data to be stored in the external memory.

When the received packet is normal, the information to be transmitted to the processor is selected from information which are extracted from the packet header and stored in the queue (S850).

After the information to be transmitted to the processor is stored in the queue, the processor receives the information stored in the queue and processes the protocol (S860).

When the protocol is completely processed by the processor, the information stored in the external memory is transmitted to the host memory and stored (S870).

After receiving of the packet is completed through the aforementioned procedure from s810 to s850, if another packet is stored in the IP layer, the same process is continuously performed. Procedures from S810 to S850 are asynchronously pipelined with the other procedures from S860 to S870.

While the present invention has been shown and described in connection with the exemplary embodiments, it will be apparent to those skilled in the art that modifications and variations can be made without departing from the spirit and scope of the invention as defined by the appended claims.

What is claimed is:

1. A hardware apparatus for receiving a packet for a TOE (TCP offload engine), the hardware apparatus comprising:

a header processing part analyzing a header of a packet transmitted from an IP layer, classifying the type of the packet, extracting from the packet, based on an analysis result of analyzing the header, first information to be used by a processor for processing the packet, and storing the first information in a queue configured to store information for different types of packets; and a memory interfacing part extracting from the packet second information to be stored in a host memory based on the analysis result of the header processing part and storing the second information in an external memory by using an address allocated by a memory table.

2. The hardware apparatus of claim 1, wherein the header processing part is constructed with at least two queues so that a reception processor and a transmission processor are allowed to access the queues, respectively.

3. The hardware apparatus of claim 1, wherein when the transmitted packet is a TCP or UDP packet having a payload as a result of the analysis, the payload is stored in the external memory by using the memory interfacing part.

4. The hardware apparatus of claim 1, wherein as a result of the analysis of the header processing part, when the transmitted packet is an echo request ICMP, a time stamp ICMP, a redirect ICMP, a TCP SYN, or a TCP ACK, an operation of the memory interfacing part is stopped.

5. The hardware apparatus of claim 1, wherein as a result of analysis of the header processing part, when the entirely transmitted packet has to be transmitted to the external memory, the header processing part temporarily stores header information, and the memory interfacing part imports and transmits the stored header information to the external memory and receives and stores the other part of the packet from the IP layer.

6. The hardware apparatus of claim 1, wherein when receiving an allocation request from the memory interfacing part, the memory table transmits an index of an empty area.

7. The hardware apparatus of claim 6, wherein the memory table includes:

an allocation table allocating or releasing memory areas in response to an allocation request or release request to be transmitted from the memory interfacing part or processor; and a memory table controller arbitrating requests of the memory interfacing part and the processor.

8. The hardware apparatus of claim 7, wherein the allocation table manages the external memory by dividing a memory area into blocks having a small size.

9. The hardware apparatus of claim 1, further comprising a checksum calculator calculating a checksum by using the header information transmitted from the header processing part.

10. The hardware apparatus of claim 9, wherein when an error occurs in the checksum calculated by the checksum calculator, the memory interfacing part transmits a release request to the allocation table.

11. A receiving system using packet receiving hardware for a TOE (TCP offload engine), the receiving system comprising:

packet receiving hardware analyzing a header of a packet transmitted from an IP layer, storing, based on an analysis result of analyzing the header, first information to be used by a processor for processing the packet in an internal queue configured to store information for different types of packets, and storing second information to be transmitted to a host memory in an external memory by analyzing a packet received from an IP layer;

a reception processor processing a protocol by using the first information stored in the queue; and a memory controller transmitting the second information stored in the external memory to the host memory, when the protocol is completely processed by the reception processor.

12. The receiving system of claim 11, wherein the packet receiving hardware includes:

a header processing part analyzing the header of the packet transmitted from the IP layer, classifying the type of the packet, extracting the first information based on the analysis result, and storing the extracted first information in the queue;

a memory interfacing part extracting the second information from the packet based on the analysis result of the header processing part and storing the extracted second information in the external memory; and a memory table allocating an address of the external memory and transmitting the address to the memory interfacing part.

13. The receiving system of claim 12, wherein the packet receiving hardware further includes a checksum calculator calculating a checksum by using header information transmitted from the header processing part.

14. The receiving system of claim 12, wherein the memory table includes:

an allocation table allocating or releasing memory areas in response to an allocation request or release request to be transmitted from the memory interfacing part or processor;

and a memory table controller arbitrating requests of the memory interfacing part and the processor.

15. The receiving system of claim 12, wherein when receiving an allocation request from the memory interfacing part, the memory table transmits an index of an empty area.

16. The receiving system of claim 11, wherein the packet receiving hardware transmits information to a transmission processor based on the type of the received packet.

17. The receiving system of claim 16, wherein the received packet is an echo request, a time stamp, a redirect, a TCP SYN, or a TCP ACK.

18. The receiving system of claim 11, wherein when the received packet is a TCP or UDP packet, a payload of the packet is stored in the external memory.

19. A method of receiving a packet for a TOE (TCP offload engine), the method comprising:

analyzing a packet received from an IP layer;

storing a part to be transmitted to a host memory based on an analysis result of analyzing the header in an external memory;

extracting from the packet, based on the analysis result, information to be used by a processor for processing the packet and storing the extracted information in a queue configured to store information for different types of packets;

processing a protocol by using a processor by using the information stored in the queue; and transmitting the information stored in the external memory to the host memory, when the protocol is completely processed.

20. The method of claim 19, wherein the analyzing of the packet includes:

receiving the packet from the IP layer;

extracting header information from the received packet; and analyzing the header information.

21. The method of claim 19, further comprising calculating a checksum of the received packet.

22. The method of claim 19, wherein the storing of the part to be transmitted to the host memory includes:

extracting a part to be transmitted to the host memory from the packet based on the analysis result; and storing the extracted information in an allocated area of the external memory by using index of a memory area allocated by a memory table.

23. The method of claim 22, wherein the storing of the extracted information in the allocated area of the external memory includes:

requesting the memory table to allocate memory areas by using the memory interfacing part; and extracting an index of an empty area in the external memory by using the memory table in response to the request and transmitting the extracted index to the memory interfacing part.

* * * * *